US010511791B2

(12) United States Patent
Kobayashi et al.

(10) Patent No.: US 10,511,791 B2
(45) Date of Patent: Dec. 17, 2019

(54) IMAGE CAPTURING APPARATUS CAPABLE OF PERFORMING READOUT FROM A PLURALITY OF DIVIDED AREAS OF A PIXEL AREA AND CONTROL METHOD THEREFOR

(71) Applicant: CANON KABUSHIKI KAISHA, Tokyo (JP)

(72) Inventors: Hirokazu Kobayashi, Tokyo (JP); Nobuhiro Takeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/608,470

(22) Filed: May 30, 2017

(65) Prior Publication Data
US 2017/0353674 A1 Dec. 7, 2017

(30) Foreign Application Priority Data
Jun. 1, 2016 (JP) .................................. 2016-110225

(51) Int. Cl.
*H04N 5/357* (2011.01)
*H04N 5/374* (2011.01)
(Continued)

(52) U.S. Cl.
CPC ......... *H04N 5/357* (2013.01); *H04N 5/23209* (2013.01); *H04N 5/243* (2013.01);
(Continued)

(58) Field of Classification Search
CPC ........ H04N 5/357; H04N 5/378; H04N 5/369; H04N 5/23209; H04N 9/045;
(Continued)

(56) References Cited

U.S. PATENT DOCUMENTS 8,059,180 B2 * 11/2011 Wang ................... H04N 5/3653
348/243
8,139,132 B2 * 3/2012 Sonoda ................ H04N 5/3456
348/294
(Continued)

FOREIGN PATENT DOCUMENTS

| JP | 2007-336343 A | 12/2007 |
|---|---|---|
| JP | 2008-124527 A | 5/2008 |
| JP | 2013-243781 A | 12/2013 |

OTHER PUBLICATIONS

Hirokazu Kobayashi, U.S. Appl. No. 15/604,919, filed May 25, 2017 Image Capturing Apparatus, Control Method Therefor, Image Sensor, and Control Method Therefor (Application not enclosed).
(Continued)

*Primary Examiner* — Albert H Cutler
(74) *Attorney, Agent, or Firm* — Cowan, Liebowitz & Latman, P.C.

(57) ABSTRACT

In an image capturing apparatus that comprises a pixel area of pixels arranged in a matrix, output circuits apply preset processing to signals read out in parallel from divided areas obtained by dividing the pixel area in a column direction and output the processed signals, a controller performs control to execute first driving for reading out signals corresponding to a predetermined voltage to the output circuits, and second driving for reading out image signals from the pixel area, and a correction circuit generates gain data based on the predetermined voltage for correcting differences between the signals for correction of different columns output for each of the divided areas, and corrects the image signals of the divided areas using the gain data generated for the corresponding divided areas.

9 Claims, 8 Drawing Sheets

(51) Int. Cl.

| | | |
|---|---|---|
| *H04N 5/365* | (2011.01) | |
| *H04N 5/243* | (2006.01) | |
| *H04N 5/232* | (2006.01) | |
| *H04N 9/04* | (2006.01) | |
| *H04N 5/369* | (2011.01) | |
| *H04N 5/378* | (2011.01) | |

(52) U.S. Cl.
CPC ........... *H04N 5/369* (2013.01); *H04N 5/3653* (2013.01); *H04N 5/3658* (2013.01); *H04N 5/378* (2013.01); *H04N 5/3742* (2013.01); *H04N 9/045* (2013.01)

(58) Field of Classification Search
CPC .. H04N 5/3742; H04N 5/3658; H04N 5/3653; H04N 5/243
USPC .......................... 348/241, 243, 281, 302–308
See application file for complete search history.

(56) References Cited

U.S. PATENT DOCUMENTS

| | | |
|---|---|---|
| 8,570,415 B2 | 10/2013 | Takeda |
| 8,582,009 B2 | 11/2013 | Kono et al. |
| 8,692,917 B2 | 4/2014 | Takeda |
| 8,970,757 B2 | 3/2015 | Kobayashi |
| 9,030,589 B2 | 5/2015 | Sasaki et al. |
| 9,036,068 B2 * | 5/2015 | Wada ................. H04N 5/37213 348/316 |
| 2002/0179820 A1 * | 12/2002 | Stark ................. H01L 27/14609 250/208.1 |
| 2007/0103569 A1 * | 5/2007 | Kawahito .............. H04N 5/235 348/241 |
| 2007/0285518 A1 | 12/2007 | Ikeda |
| 2008/0211942 A1 | 9/2008 | Kosover |
| 2009/0079859 A1 | 3/2009 | Hagiwara |
| 2010/0020206 A1 * | 1/2010 | Takeda ................. H04N 5/3658 348/241 |
| 2010/0128150 A1 * | 5/2010 | Taguchi ............... H04N 5/2176 348/243 |
| 2010/0128158 A1 | 5/2010 | Wang |
| 2011/0233702 A1 | 9/2011 | Takahashi |
| 2013/0063640 A1 | 3/2013 | Sugiyama |
| 2015/0304578 A1 * | 10/2015 | Okura .................... H04N 5/363 348/308 |
| 2017/0111599 A1 | 4/2017 | Saito et al. |
| 2017/0353674 A1 | 12/2017 | Kobayashi |

OTHER PUBLICATIONS

U.S. Appl. No. 15/618,375, filed Jun. 9, 2017 (unpublished); Inventor: Hideki Ikedo.
The above patent documents were cited in an Office Action dated Sep. 28, 2018, which is not enclosed, that issued in a related U.S. Appl. No. 15/604,919.

* cited by examiner

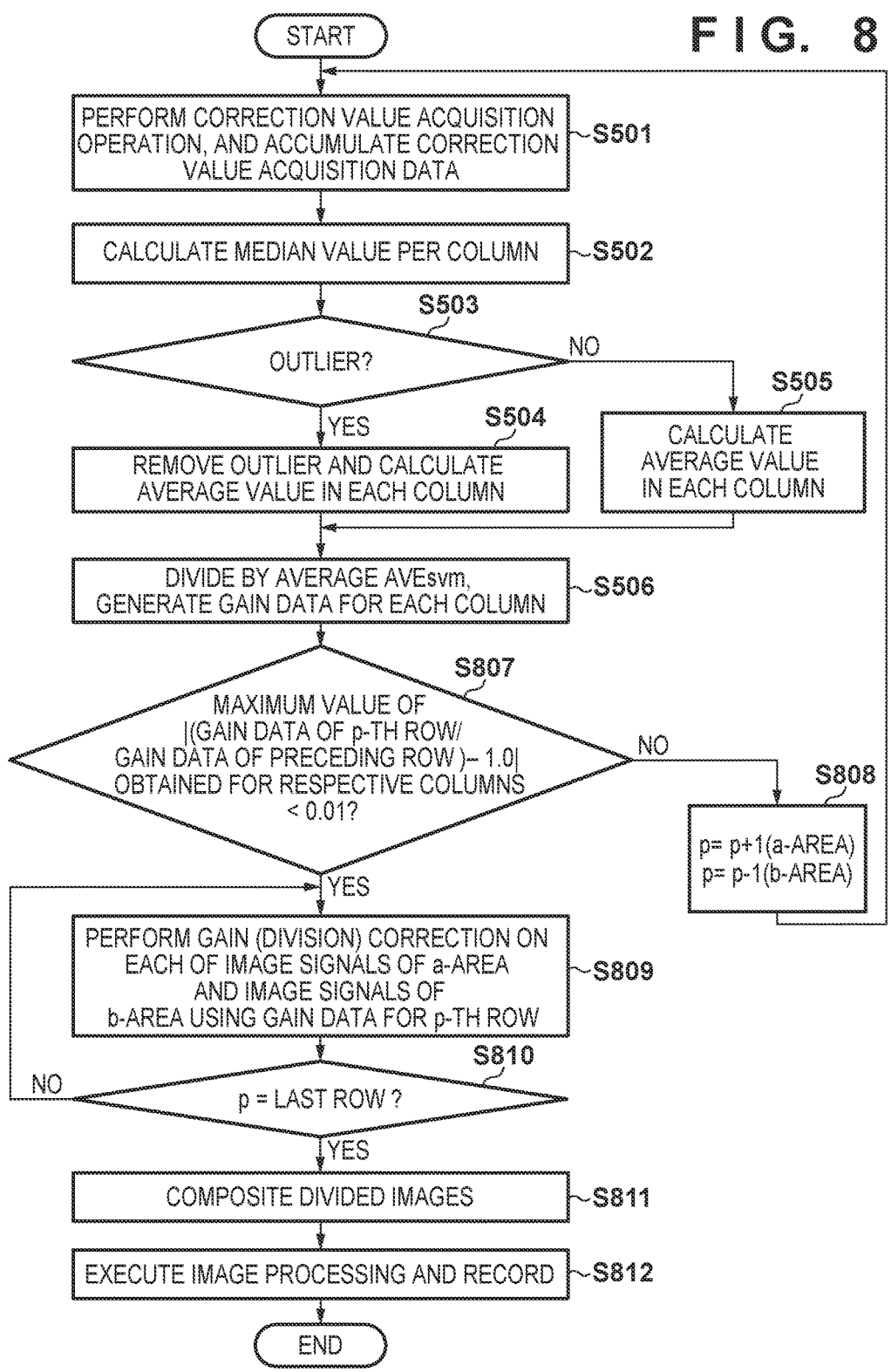

IMAGE CAPTURING APPARATUS CAPABLE OF PERFORMING READOUT FROM A PLURALITY OF DIVIDED AREAS OF A PIXEL AREA AND CONTROL METHOD THEREFOR

BACKGROUND OF THE INVENTION

Field of the Invention

The present invention relates to an image capturing apparatus and a control method therefor, and especially to an image capturing apparatus and a control method therefor that can perform readout from a pixel area that is divided into a plurality of areas.

Description of the Related Art

In recent years, demand for a large number of pixels and high frame rate has led to proposals for various techniques to further increase a readout speed in the field of image sensors. Japanese Patent Laid-Open No. 2013-243781 discloses an image sensor that includes, for example, a plurality of pixel circuits, which are arranged two-dimensionally and have photoelectric converters, amplification transistors, and selection transistors, and a plurality of vertical signal lines. The plurality of pixel circuits are divided into groups in a column direction, and each of the plurality of vertical signal lines can drive pixel circuits in a corresponding group individually, and is connected to an AD conversion circuit; in one example, pixel circuits are driven sequentially on a row-by-row basis, in a direction away from a row in which divided pixel circuits neighbor one another. As such vertical signal lines are divided, the parasitic resistance and parasitic capacitance are halved compared with a case in which undivided vertical signal lines are used, and hence a settling time in transmission of signal voltages from the pixel circuits to the vertical signal lines is shortened, which contributes to high-speed readout in the analog signal stage. Techniques that contribute to high-speed readout in the AD conversion stage and the digital signal stage have also been proposed, although the details will be omitted as these known techniques exist in various forms.

On the other hand, techniques for high-precision correction of image sensor signals on a column-by-column basis have been conventionally proposed. Japanese Patent Laid-Open No. 2008-124527 discloses a solid-state image sensing apparatus provided with a dummy pixel amplification transistor for each pixel column of an aperture pixel area. This solid-state image sensing apparatus has a dummy pixel area which outputs dummy pixel signals to vertical signal lines, and a bias control circuit that controls a bias voltage to be applied across the dummy pixel amplification transistors. These circuits are used both as solar blacking correction means when aperture pixels are selected, and as vertical stripes correction means that detects vertical stripes caused by offset and gain for each pixel column and corrects differences in signals between pixel columns when aperture pixels are not selected.

However, since the divided vertical signal lines as described above are connected to different column circuits and AD conversion circuits from each other, in addition to gain differences that occur between the column circuits and AD conversion circuits, gain differences and temperature fluctuation due to coupling capacitances generated by the divided vertical signal lines occur. Accordingly, pixel signals at the border of divided vertical signal lines exhibit characteristic differences, and the characteristic differences are noticeable and exceed a perceptible limit of a viewer even if they are minute.

Especially, in order to detect the gain difference due to coupling capacitances by taking a temperature distribution on a surface of the image sensor into consideration, it is desirable to place the dummy pixel area in the vicinity of pixels at the border of divided vertical pixel lines, not in the vicinity of the AD conversion circuits. However, it is very difficult to place the dummy pixel area in the vicinity of pixels at the border of divided vertical signal lines.

SUMMARY OF THE INVENTION

The present invention has been made in consideration of the above situation, and in the case of an image sensor that performs readout from a pixel area divided in a vertical direction, the present invention corrects gain differences between pixel columns at the border of divided areas with high precision without using a dummy pixel area.

According to the present invention, provided is an image capturing apparatus comprising: a pixel area composed of a plurality of pixels arranged in a matrix; a plurality of output circuits that apply preset processing to signals which are read out in parallel from a plurality of divided areas obtained by dividing the pixel area in a column direction and output the processed signals; a controller that performs control to execute first driving for reading out signals corresponding to a predetermined voltage to the output circuits, and second driving for reading out image signals from the pixel area to the output circuits; and a correction circuit that generates gain data based on the predetermined voltage for correcting differences between the signals for correction of different columns output via the output circuits for each of the divided areas, and corrects the image signals of the divided areas output via the output circuits using the gain data generated for the corresponding divided areas, wherein the predetermined row is part of rows that includes a row at a border of the divided areas.

Further, according to the present invention, provided is a control method for an image capturing apparatus that includes a pixel area and a plurality of output circuits, the pixel area being composed of a plurality of pixels arranged in a matrix, the output circuits applying preset processing to signals which are read out in parallel from a plurality of divided areas obtained by dividing the pixel area in a column direction and outputting the processed signals, the control method comprising: reading out signals corresponding to a predetermined voltage to the output circuits; generating gain data based on the predetermined voltage for correcting differences between the signals for correction of different columns output via the output circuits for each of the divided areas; reading out image signals from the pixel area to the output circuits; and correcting the image signals of the divided areas output via the output circuits using the gain data generated for the corresponding divided areas, wherein the predetermined row is part of rows that includes a row at a border of the divided areas.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 8 is a flowchart of correction processing executed by an image capturing apparatus according to a third embodiment.

DESCRIPTION OF THE EMBODIMENTS

Exemplary embodiments of the present invention will be described in detail in accordance with the accompanying drawings.

First Embodiment

Figure 1:
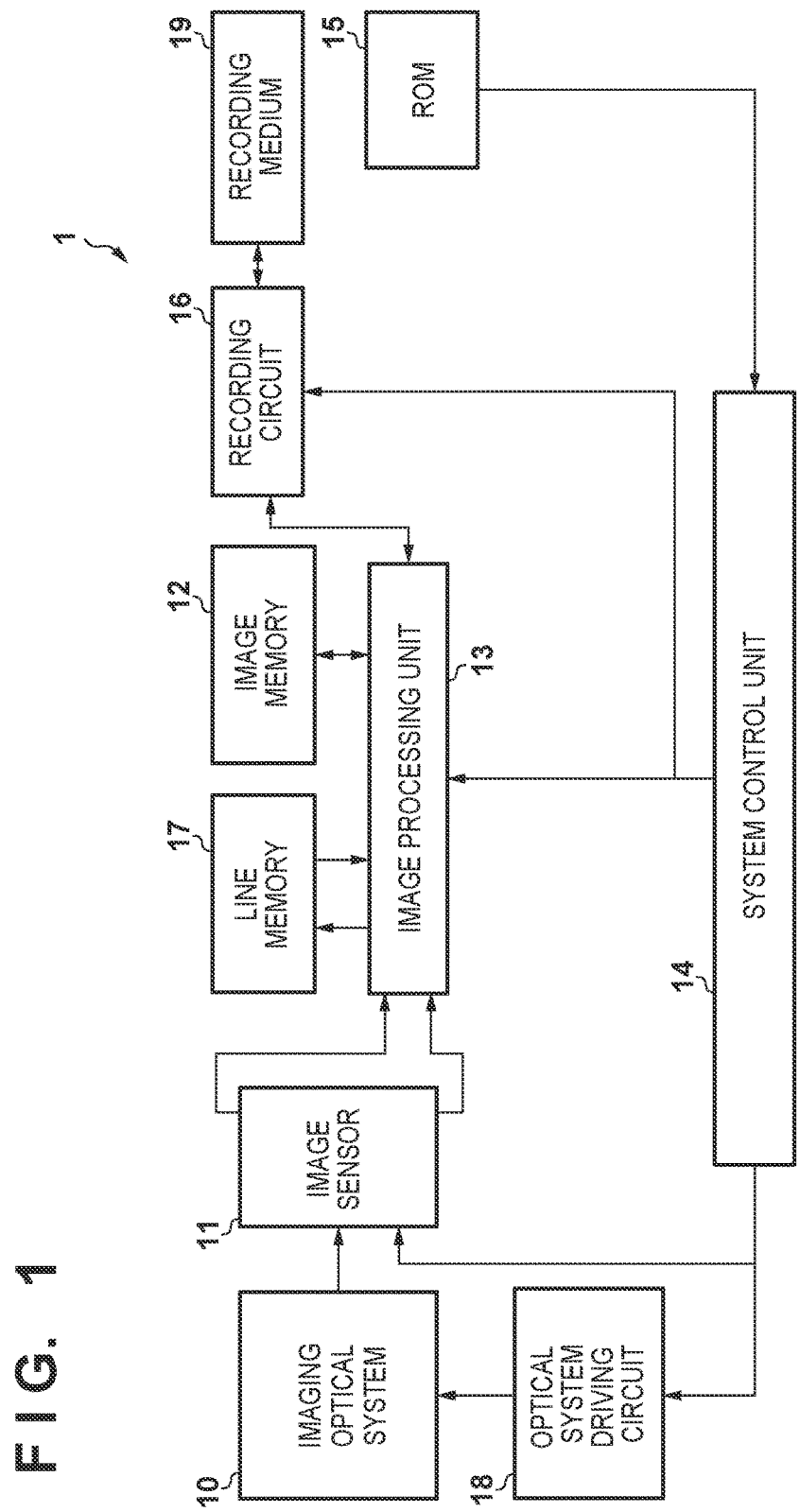
FIG. 1 is a block diagram showing a schematic configuration of an image capturing apparatus according to a first embodiment of the present invention.

FIG. 1 is a block diagram showing a schematic configuration of an image capturing apparatus 1 according to a first embodiment of the present invention. In FIG. 1, a system control unit 14 is an overall control unit that executes control programs for controlling the entirety of the image capturing apparatus 1. The control programs may be stored in a ROM 15 in whole or part, and may be configured such that one or more necessary programs are read out and executed for each individual control mode. Specific addresses indicating defects are also recorded in the ROM 15, and used in calculation of gain data for each pixel column used in correction processing.

Upon accepting an instruction related to a diaphragm, zooming, focusing, and the like from a user via a non-illustrated console unit, the system control unit 14 operates an imaging optical system 10 via an optical system driving circuit 18, specifically, performs intended control and opens/closes a non-illustrated shield, such as a mechanical shutter.

An image sensor 11 receives light formed by the controlled imaging optical system 10, performs photoelectric conversion, and generates digital image signals by applying AD conversion to voltage signals obtained through the photoelectric conversion. The image sensor 11 performs a sequence of driving operations as the system control unit 14 selects and sets a driving pattern for a later-described timing generation circuit (TG) 22. In the first embodiment, as will be described later, vertical signal lines of the image sensor 11 are each divided into two in a column direction, and AD conversion is performed on voltage signals output via the divided vertical signal lines in parallel, sequentially on a row-by-row basis; thus, digital image signals corresponding to two rows are transferred to an image processing unit 13.

The digital image signals output by the image sensor 11 are temporarily stored as a group of signals to an image memory 12 on a frame-by-frame basis, or cumulatively stored to a line memory 17 on a row-by-row basis for calculation of gain data for each pixel column. Upon completion of transfer from the number of rows necessary for calculation of gain data for each pixel column, defect reduction processing, averaging processing, and the like are applied to data cumulatively stored in the line memory 17, and gain correction is performed on image data that is to be stored to the image memory 12, as will be described later in detail. After the gain-corrected digital image signals corresponding to one frame are temporarily stored to the image memory 12, and then an image processing unit 13 executes predetermined image processing.

Examples of the image processing executed by the image processing unit 13 include the aforementioned gain correction, composition of divided elements, white balance correction, synchronization processing, noise reduction, and sharpness adjustment.

Images to which the image processing has been applied by the image processing unit 13 are compressed by a recording circuit 16 to conform to the image standard of Joint Photographic Experts Group (JPEG) and the like, and then recorded to a recording medium 19.

Figure 2:
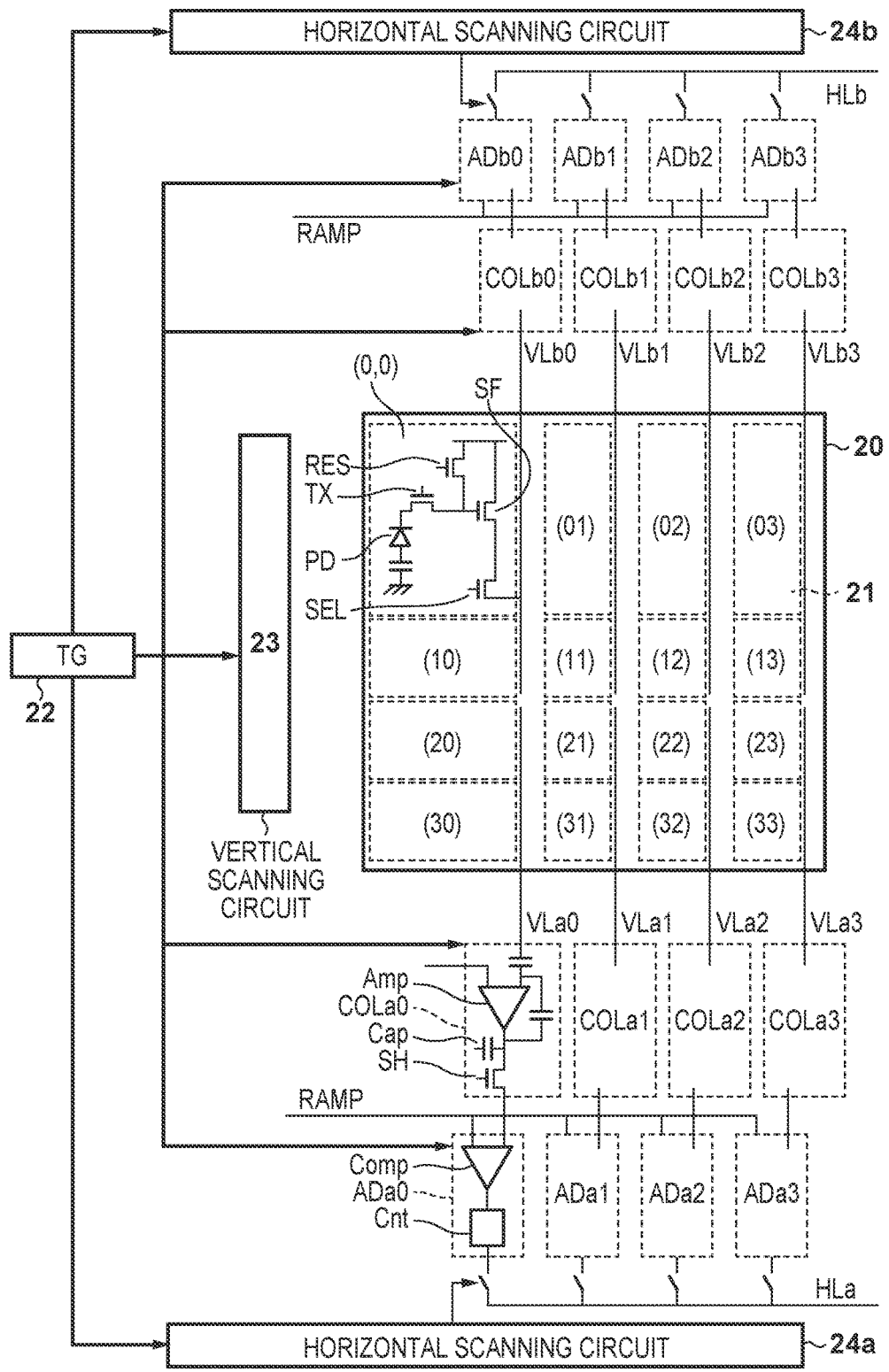
FIG. 2 is a block diagram showing a configuration of an image sensor according to the first embodiment.

FIG. 2 is a block diagram showing a configuration of the image sensor 11 according to the first embodiment. FIG. 2 shows pixels 21 arranged in a matrix of four rows and four columns as pixels composing an aperture pixel area 20 (a pixel area). Hereinafter, under the assumption that a row is denoted by "p" and a column is denoted by "q," a pixel $21(pq)$ denotes a pixel in the $p^{th}$ row and the $q^{th}$ column; for example, a pixel $21(00)$ denotes a pixel in the $0^{th}$ row and the $0^{th}$ column. Although FIG. 2 shows only 16 pixels, oftentimes there are tens of millions of pixels in practice.

In each pixel 21, light incident thereon via the imaging optical system 10 is converted into charges corresponding to a light amount by a photodiode PD (a photoelectric conversion element). A transfer transistor TX transfers the charges generated by the photodiode PD to a transfer node including a gate of an amplification transistor SF composing a source follower. A reset transistor RES is used to reset the transfer node to a predetermined voltage. The photodiode PD can be reset by turning ON the reset transistor RES and the transfer transistor TX simultaneously. A selection transistor SEL is connected to an output node including a drain of the amplification transistor SF, and outputs a voltage of the output node to a later-described vertical signal line VL when a pertinent row is selected.

A vertical scanning circuit 23 controls the transfer transistors TX, reset transistors RES, and selection transistors SEL concurrently in a horizontal direction at their respective predetermined timings, and also controls them sequentially in a column direction; consequently, the pixels 21 are driven and controlled on a row-by-row basis.

Vertical signal lines VL are each divided into an upper wire and a lower wire, which are denoted by VLbq and VLaq, respectively, in FIG. 2. Therefore, a set of the divided vertical signal lines VLaq and a set of the divided vertical signal lines VLbq each enable signal readout on a row-by-row basis; that is, signals from two rows can be read out simultaneously. Hereinafter, the components that process signals output to the vertical signal lines VLaq (i.e., signals from the lower half of the pixel area) will be assigned a reference sign "a," whereas the components that process signals output to the vertical signal lines VLbq (i.e., signals from the upper half of the pixel area) will be assigned a reference sign "b." Also, the lower half of the pixel area denoted by "a" will be referred to as an "a-area," whereas the upper half of the pixel area denoted by "b" will be referred to as a "b-area." In FIG. 2, each column is divided into the a-area and the b-area, with the pixels 21(1q) in the second row and the pixels 21(2q) in the third row serving as a border region. Voltages corresponding to the charges generated by the photodiodes PD are transmitted to column circuits COLaq and COLbq via the vertical signal lines VLaq and VLbq, respectively.

In each of the column circuits COLaq and COLbq, a difference voltage indicating a difference from a non-illustrated reference voltage is amplified by an amplification circuit Amp arranged with negative feedback through a predetermined capacitance, and the amplified voltage is temporarily stored to an accumulation unit Cap. Furthermore, a readout control transistor SH for reading out the amplified voltage from the accumulation unit Cap is provided. The column circuits COLaq and COLbq transmit the amplified voltages to AD conversion circuits ADaq and ADbq.

The AD conversion circuits ADaq and ADbq each includes a comparator Comp that compares the voltage output by the column circuit COLaq or COLbq with a RAMP signal that increases or decreases in proportion to time, and a counter circuit Cnt with an Enable terminal to which the output from the comparator Comp is input. The counter circuit Cnt can obtain a digital count value corresponding to the charges generated by the photodiode PD by performing a count operation under later-described predetermined control in accordance with the result of comparison between the RAMP signal and the voltage output by the column circuit COLaq or COLbq. This enables analog-to-digital conversion.

Two horizontal scanning circuits 24a and 24b each read out digital image capture signals corresponding to one row by sequentially selecting, in the horizontal direction, the digital count values output by the AD conversion circuits ADaq or ADbq, and transferring them to a horizontal signal line HLa or HLb.

The timing generation circuit (TG) 22 generates timing signals for sequentially controlling the vertical scanning circuit 23, horizontal scanning circuits 24a and 24b, AD conversion circuits ADaq and ADbq, and so forth. The timing signals may be generated by, for example, causing the system control unit 14 to select one of several patterns stored in the ROM 15.

Figure 3:
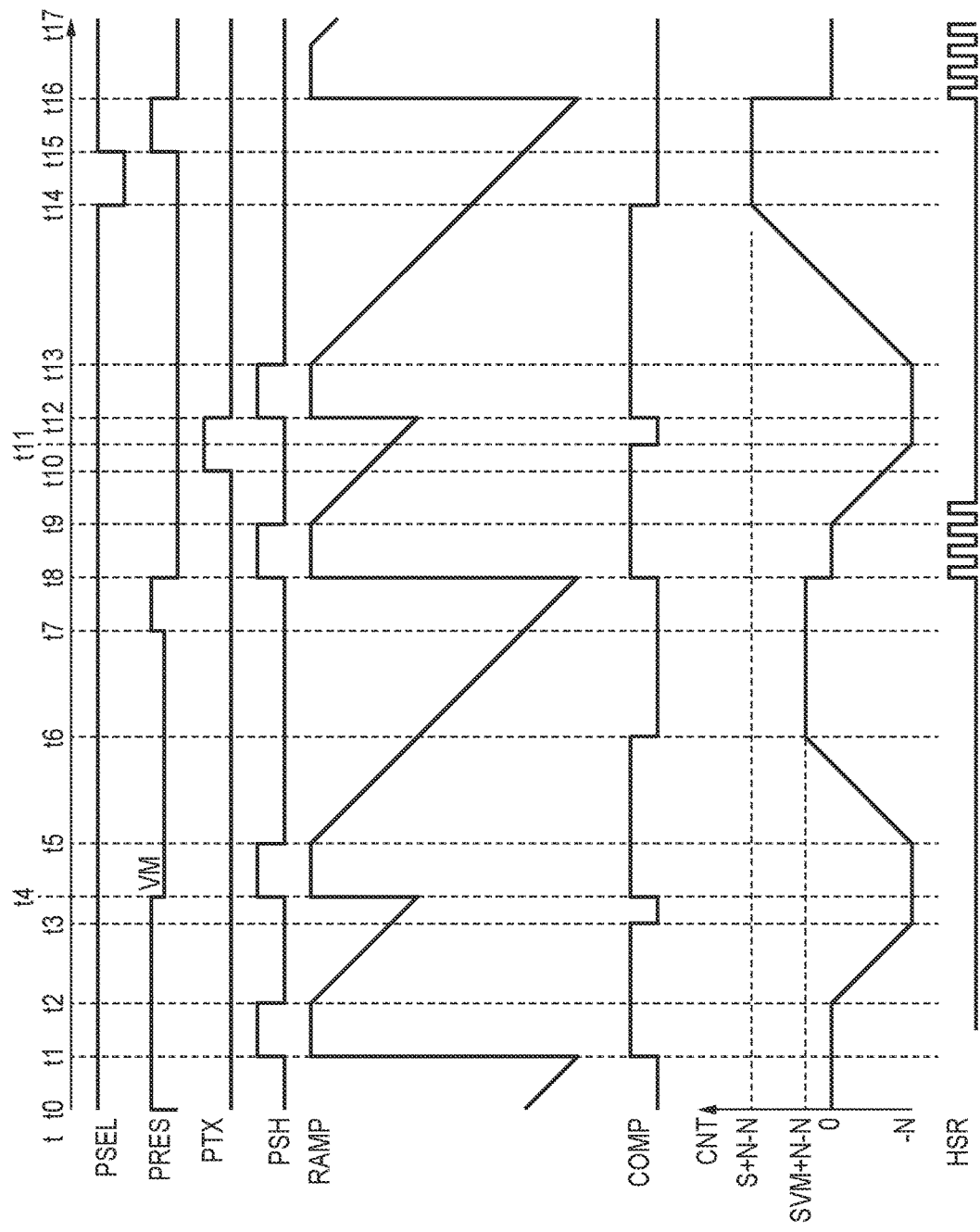
FIG. 3 is a timing chart showing a method of driving the image sensor according to the first embodiment.

FIG. 3 is a timing chart showing timings for driving the pixels 21 at the border of divided areas in the first embodiment. In the first embodiment, correction values are obtained by driving, among the pixels 21 in the aperture pixel area 20, the pixels 21 in the second and third rows at the border of divided areas, that is, the border between the vertical signal lines VLaq and the vertical signal lines VLbq. Thereafter, image signals are read out from all of the pixels 21, including the pixels 21 in the second and third rows.

In FIG. 3, a selection signal PSEL and a transfer signal PTX denote signals that are applied to the gates of the selection transistors SEL and transfer transistors TX in the pixels 21(pq), respectively. Each transistor is ON during a Hi period of the corresponding signal, and OFF during a Lo period of the corresponding signal. A reset signal PRES denotes a signal that is applied to the gate of the reset transistors RES, and is ON during a Hi period of the reset signal PRES and OFF during a Lo period of the rest signal PRES. In addition, during a correction value acquisition operation, a predetermined intermediate voltage VM between a Hi voltage and a Lo voltage is applied as the reset signal RES in order to measure a gain.

A control signal PSH denotes a signal applied to the gates of the readout control transistors SH in the column circuits COLaq and COLbq, and the readout control transistors SH are ON during a Hi period of the control signal PSH, and OFF during a Lo period of the control signal PSH. RAMP denotes the RAMP signal, COMP denotes the output from the comparators Comp, and CNT denotes a count value from the counter circuits Cnt. HSR denotes a horizontal scanning signal generated by the horizontal scanning circuits 24a and 24b.

Figure 4:
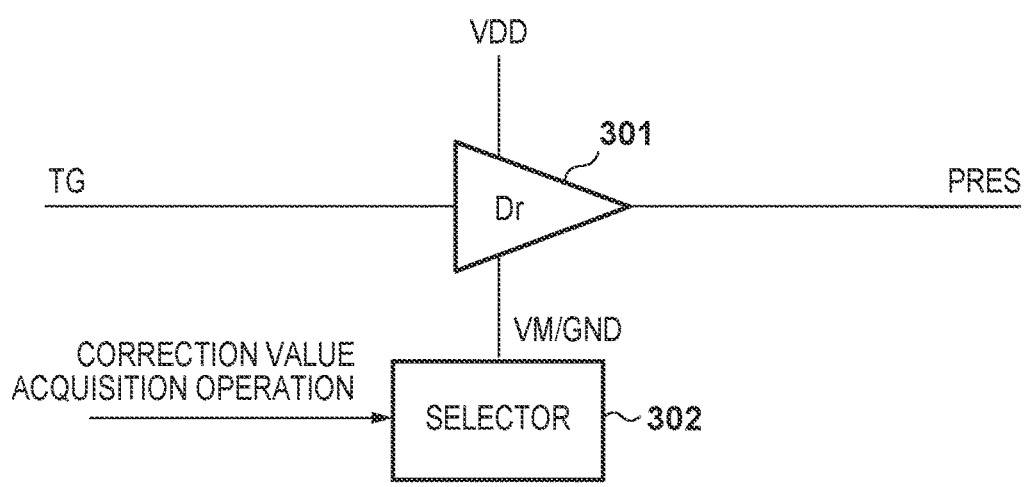
FIG. 4 is a block diagram showing part of a driver circuit of the image sensor according to the first embodiment.

FIG. 4 is a block diagram illustrating an example of part of a driver circuit of the image sensor 11 constituted as being capable of performing the correction value acquisition operation, especially a driver circuit that generates the reset signal PRES that is to be applied to the gates of the rest transistors. The driver circuit includes a driver (Dr) 301 and a selector 302. The driver 301 outputs, in response to a control signal from the TG 22, a power supply voltage VDD during a Hi period and outputs an intermediate voltage VM or a ground voltage GND during a Lo period. The selector 302 selects either of the intermediate voltage VM or ground voltage GND during the Lo period based on a signal indicating the correction value acquisition operation, and outputs the selected voltage to the driver 301. Note that the intermediate voltage VM can be changed.

In the process shown in FIG. 3, the correction value acquisition operation is performed first. At time t0, the reset signal PRES is placed into a Hi state, thereby turning ON the reset transistors RES and resetting the transfer nodes to a predetermined power supply voltage. If a normal signal readout operation is performed, the reset transistors RES are tuned OFF to place the transfer nodes to a floating state, however, in the correction value acquisition operation, the reset transistors RES are not tuned OFF. Meanwhile, as the selection signal PSEL is in a Hi state, the voltage of the transfer nodes in the pixels 21(1q) and the voltage of the transfer nodes in the pixels 21(2q) (hereinafter, "reference voltage N") are output to the vertical signal lines VLaq and VLbq, respectively, via the selection transistors SEL. Then, the reference voltage N is amplified by the amplification circuits Amp in the column circuits COLaq and COLbq.

By time t2, the readout control transistors SH that perform readout from the accumulation units Cap in the column circuits COLaq and COLbq are turned ON and then OFF, to set the voltage (reference level N) obtained by amplifying the reference voltage N as the voltage to be transmitted to the AD conversion circuits ADaq and ADbq. Then, at time t2, the RAMP signal is generated, and AD conversion of the reference level N is performed by counting an elapsed period until the RAMP signal becomes equal to the reference level N with use of the counter circuits Cnt. At time t2, the reference level N is smaller than the RAMP signal, and thus the output from the comparators Comp is Hi. The counter circuits Cnt operate using this output from the comparators Comp as an Enable signal.

At time t3, the reference level N becomes equal to or larger than the RAMP signal, and the output from the comparators Comp changes into Lo. As a result, the counter circuits Cnt are placed in a stopped state, and AD conversion of the reference level N is automatically ended. Note that during AD conversion of the reference level N, which starts at time t2, the counter circuits Cnt perform counting down.

If the signal readout operation is performed, the transfer signal PTX is placed into a Hi state, thereby turning ON the transfer transistors TX by time t4, however, in the correction value acquisition operation, the transfer signal PTX maintains in a Lo state until time t10, and the charges are not transferred from the photodiodes PD. It should be noted that, in the first embodiment, the intermediate voltage VM is applied to the gates of the reset transistors RES after time t2 before time t4. The intermediate voltage VM can be arbitrarily set between the ground voltage GND and the power supply voltage VDD as needed.

Then, by time t5, the readout control transistors SH that perform readout from the accumulation units Cap in the column circuits COLaq and COLbq are turned ON and then OFF again. As a result, the voltage (intermediate level VM) obtained by amplifying the voltage of the transfer nodes that corresponds to the intermediate voltage VM as the voltage to be transmitted to the AD conversion circuits ADaq and ADbq. Then, at time t5, the RAMP signal is generated, and AD conversion of the intermediate level VM is performed by counting an elapsed period until the RAMP signal becomes equals to the intermediate level VM. As the counter circuits Cnt have performed counting down to the reference level N, they each start counting up at time t5 to obtain a difference SVM between the reference level N and the intermediate level VM, at time t6 at which the counting is ended. In this way of counting, it is possible to reduce offset noises between columns due to offset differences between the amplification circuits Amp of respective columns, variation in capacitances of the accumulation units Cap, and variation in thresholds of the readout control transistors SH, and so forth, in addition to a reset noise of the transfer nodes.

Then, from time t8 to time t10, the horizontal scanning signal is generated to sequentially select, in the horizontal direction, the differences SVM obtained through AD conversion. As a result, the differences SVM are sequentially transferred to the horizontal signal lines HLa and HLb on a column-by-column basis, and accumulated in the line memory 17 separately for the a-area and the b-area.

Note that the foregoing driving for obtaining the correction values may be performed multiple times. In this case, readout from the pixels at the border of divided areas may be performed multiple times. Furthermore, as the reference level may change between time t2 and time t5 due to the influence of, for example, minute leakage of charges from the transistors composing the pixels at the border of divided areas, the driving for obtaining the correction values may be performed multiple times with a selection of a plurality of rows in the vicinity of the pixels at the border of divided areas.

In order to obtain gain data for each pixel column, a reference node capable of giving a predetermined voltage is needed, and a pixel dummy area has conventionally been used in consideration of its operability. On the other hand, it is desirable that the reference node includes pixels at the border of divided areas of the vertical signal lines VL in order to precisely correct the signal levels of pixels at the border of divided areas, however, it is very difficult to arrange a pixel dummy area near pixels at the border of divided areas. Accordingly, in the first embodiment, the correction value acquisition operation is performed by using the pixels $21(1q)$ and $21(2q)$ at the border of divided areas as a reference node with the special operation as described above.

Once the foregoing the correction value acquisition processing has been ended, optical signals are read out from the pixels at the border of divided areas while these pixels are maintained in a selected state, without changing the polarity of the selection signal PSEL.

First, from time t7 to time t8, the reset signal PRES is placed into a Hi state, thereby turning ON the reset transistors RES and resetting the transfer nodes to the predetermined power supply voltage. At time t8, the reset transistors RES are turned OFF, and the transfer nodes are placed into the floating state. Meanwhile, as the selection signal PSEL is in the Hi state, the voltage of the transfer nodes is transmitted to the vertical signal lines VLaq and VLbq via the selection transistors SEL. This voltage (reference voltage N) is amplified by the amplification circuits Amp in the column circuits COLaq and COLbq.

By time t9, the readout control transistors SH that perform readout from the accumulation units Cap in the column circuits COLaq and COLbq are turned ON and then OFF, to set the voltage (reference level N) obtained by amplifying the reference voltage N as the voltage to be transmitted to the AD conversion circuits ADaq and ADbq. Then, at time t9, the RAMP signal is generated, and AD conversion of the reference level N is performed by counting an elapsed period until the RAMP signal becomes equal to the reference level N with use of the counter circuits Cnt. At time t9, the reference level N is smaller than the RAMP signal, and thus the output from the comparators Comp is Hi. The counter circuits Cnt operate using this output from the comparators Comp as an Enable signal.

At time t11, the reference level N becomes equal to or larger than the RAMP signal, and the output from the comparators Comp changes into Lo. As a result, the counter circuits Cnt are placed in the stopped state, and AD conversion of the reference level N is automatically ended. Note that before time t9 at which AD conversion of the reference level N starts, the counter circuits Cnt are reset to 0, and then start counting down.

On the other hand, from time t10 to time t12, the transfer signal PTX is placed into a Hi state, thereby turning ON the transfer transistors TX and transferring light charges generated by the photodiodes PD to the transfer nodes. A reduction in the voltage of the transfer nodes, which occurs in accordance with the light charges, is reflected by the voltage of the vertical signal lines VLaq and VLbq. This voltage is amplified by the amplification circuits Amp in the column circuits COLaq and COLbq, similarly to the reference level N.

At time t12, the RAMP signal is generated, and AD conversion of a signal level is performed while counting an elapsed period until the RAMP signal becomes equal to an amplified signal voltage. At this time, the counter circuits Cnt perform counting up from the count value obtained by performing counting down to the reference level N. Therefore, at time t14 at which the counting is ended, a count value is obtained as a result of AD conversion of the voltage S corresponding to the light charges from which noise components are reduced.

Then, from time t16 to time t17, the horizontal scanning signal is generated to sequentially select, in the horizontal direction, count values of light levels S after AD conversion. As a result, digital image capture signals corresponding to one row are sequentially transferred to each of the horizontal signal lines HLa and HLb on a column-by-column basis. Note that digital signals on the horizontal signal lines HLa and HLb are output in a format of high-speed serial signals, such as low-voltage differential signals (LVDS).

The selection signal PSEL is placed into a Lo state in an arbitrary period between time t13 and time 15, specifically in a period from time t14 to time t15 in FIG. 3. This turns OFF the selection transistors SEL, and ends the selection of the pixels at the border of divided areas; as a result, pixels away from the border of divided areas, for example, the pixels $21(0q)$ and the pixels $21(3q)$ in the next scanning rows, will be selected in sequence. Driving similar to the aforementioned signal readout driving from time t7 to t16 is repeated for the rows selected next.

In the first embodiment, it is sufficient to obtain correction value acquisition data (differences SVM) for correction of column-to-column gain differences by using the pixels at the border of divided areas as reference nodes. Therefore, the correction value acquisition operation may be performed after light shielding by the mechanical shutter included in the imaging optical system 10 of the image capturing apparatus, or before the start of exposure. Such correction value acquisition operation, which involves light shielding by the mechanical shutter, is more suitable for a still image mode than for a moving image mode in which signal charges are constantly generated.

Figure 5:
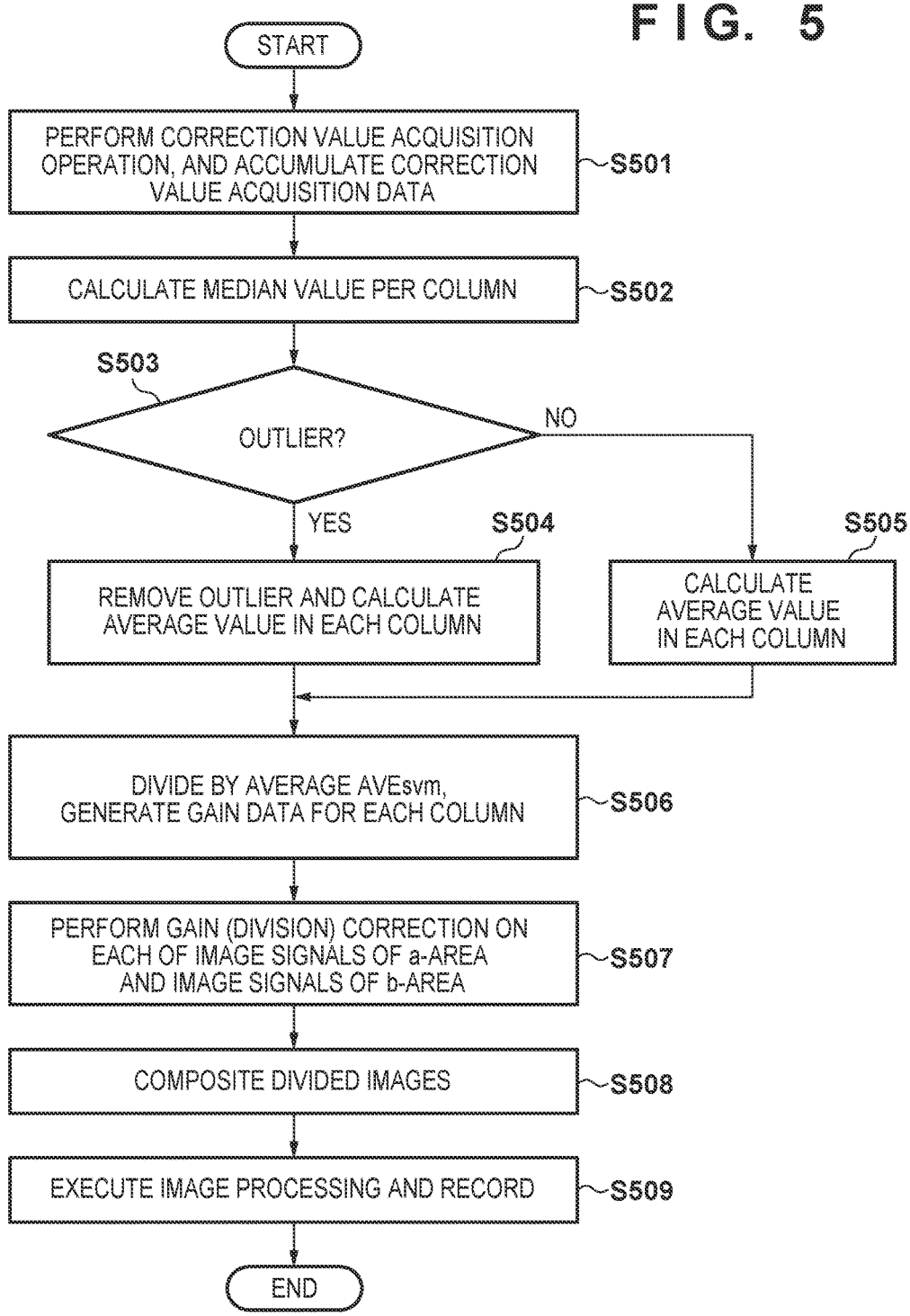
FIG. 5 is a flowchart of correction processing executed by the image capturing apparatus according to the first embodiment.

A description is now given of a correction operation that is performed using correction value acquisition data (differences SVM) accumulated in the line memory 17 in the above-described manner. FIG. 5 is a flowchart of correction processing executed by the image capturing apparatus according to the first embodiment.

First, in step S501, correction value acquisition data is obtained through the above-described correction value acquisition operation. It will be assumed that a plurality of pieces of correction value acquisition data are obtained per column by performing the correction value acquisition operation multiple times with respect to pixels at the border of divided areas, or by performing the correction value acquisition operation with respect to pixels near the border of divided areas. The pieces output via the vertical signal lines VLaq and the pieces output via the vertical signal lines VLbq are accumulated in the line memory 17 in two different groups, respectively. Upon completion of the accumulation, a median value is calculated per column in step S502.

It is known that random telegraph signal noise and the like make the obtained correction values variant with a predetermined probability. In view of this, favorable correction effects are achieved by removing the variant correction values as outliers. Thus, in step S503, outliers are detected based on the median values. That is, the image processing unit 13 determines whether a difference between the median value and the accumulated data exceeds a predetermined threshold on a column-by-column basis. If there is any outlier in a target column, the processing proceeds to step S504 in which the outlier is removed and an average value is obtained. If there is no outlier in a target column, the processing proceeds to step S505 in which a normal average value is obtained. If a change in the reference level caused by the influence of, for example, minute leakage of charges from the transistors composing the pixels at the border of divided areas is evident between time t2 and time t5 of FIG. 3, the corresponding column coordinate and the amounts of change may be recorded to the ROM 15 and used in a subtraction process.

In step S506, gain data for correction for each pixel column is generated by dividing the average of each column by an average AVEsvm of the averages of all the columns. The reason for generating gain data for each column as described above is as follows. First, the collection value acquisition data includes gain differences between the amplification circuits Amp of different columns, gain differences between columns due to variation in thresholds of transistors constituting the comparators Comp, gain differences between columns due to coupling capacitances generated between the transfer nodes and the corresponding divided vertical signal lines VL, and so on, with respect to the average AVEsvm of all the columns. Therefore, by dividing the collection value acquisition data of each pixel column by the average AVEsvm, gain data for each pixel column can be obtained. Especially, by obtaining the average value AVEsvm of all the columns from the collection value acquisition data of all the columns obtained through either of the vertical signal lines VLaq and VLbq, differences between the signals of the a-area and the signals of the b-area can be eliminated for each column in a case where the same intermediate voltage VM is input.

In step S507, image signals of the a-area and image signals of the b-area, which have been obtained through the above-described readout driving and temporarily stored in the image memory 12, undergo gain correction (division) using the corresponding gain data for correction for each pixel column on a column-by-column basis. As a result, characteristic differences at the border of divided areas are rendered unnoticeable.

In step S508, divided images are composited into a single image. In step S509, the image processing unit 13 executes image processing, such as defect correction, white balancing, tone conversion, synchronization processing, and noise reduction, and records the resultant image to the predetermined recording medium 19 via the recording circuit 16.

As described above, in the first embodiment, the correction value acquisition operation for detecting vertical stripes due to gain by applying the intermediate voltage VM to the reset transistors RES of the pixels at the border of divided vertical signal lines. Then, the obtained correction value acquisition data is converted to gain data for correction for each pixel column using a line memory of the image capturing apparatus, and image signals of each divided area output via the divided vertical signal lines undergo gain correction; as a result, signal level differences at the border of divided vertical signal lines are rendered unnoticeable.

It should be noted that vertical stripes caused by gain may be detected for different signal levels by applying a plurality of intermediate voltages VM. Further, timing of applying the intermediate voltage VM is not limited to the timing shown in FIG. 3, and the following simple method may be adopted. Namely, assuming that the resetting of the transfer nodes by the reset signal PRES from time t0 to t1 is stopped, voltages of the transfer nodes are directly changed to the intermediate voltage VM. In this case, in order to obtain an AD conversion result of a signal level corresponding to the intermediate VM, AD conversion of the reference level N of the transfer nodes performed between time t2 and t3 has to be stopped, too. In a case where this simple method is adopted, there is a problem in which the correction value acquisition data includes offset differences between the amplification circuits Amp in different columns and offset differences between columns due to variation of capacitances of the accumulation units Cap and variation in thresholds of the readout control transistors SH. To cope with this problem, gain data for correction for each pixel column may be generated by dividing the average of each column by the average AVEsvm after subtracting one-dimensional dark shading data from the average of each column in step S506 in FIG. 5.

In addition, part of the line memory 17 and image processing unit 13 of the image capturing apparatus shown in FIG. 1 may be arranged in the image sensor 11; in that case, the image sensor 11 can output corrected digital image signals. Further, part of the line memory 17 and the image processing unit 13 may be arranged on a substrate that is different from a substrate including an aperture pixel area, and the two substrates may be connected via an electric connection unit, such as through-silicon via (TSV).

Second Embodiment

A second embodiment of the present invention will now be described. Explained in the second embodiment is a case where a plurality of different intermediate voltages VM are applied to the gates of the reset transistors RES of pixels at the border of the vertical signal liens VLaq and VLbq, and gain data corresponding to the different intermediate voltages VM are obtained for each pixel column.

Figure 6:
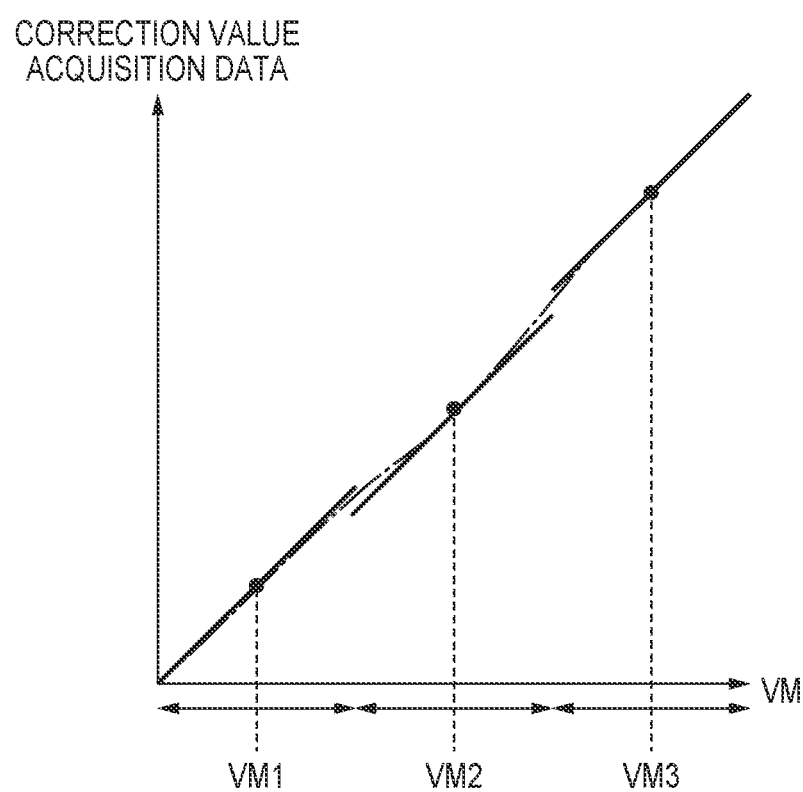
FIG. 6 is a schematic diagram showing an example of correction value acquisition data of the image capturing apparatus according to the second embodiment.

In FIG. 6, three graphs indicate examples of correction value acquisition data obtained from a given column when three different intermediate violates (signals for correction) VM1, VM2 and VM3 (VM1<VM2<VM3) are applied. It is predicted from the three graphs that the optimal gain for each signal can be derived from non-linear relationship as shown by a dash-dot line in FIG. 6, for example. In the second embodiment, it is determined which of the gains obtained by applying the intermediate voltages VM is to be used upon executing gain correction based on signal levels of pixels at the border of divided areas in a captured image.

Figure 7:
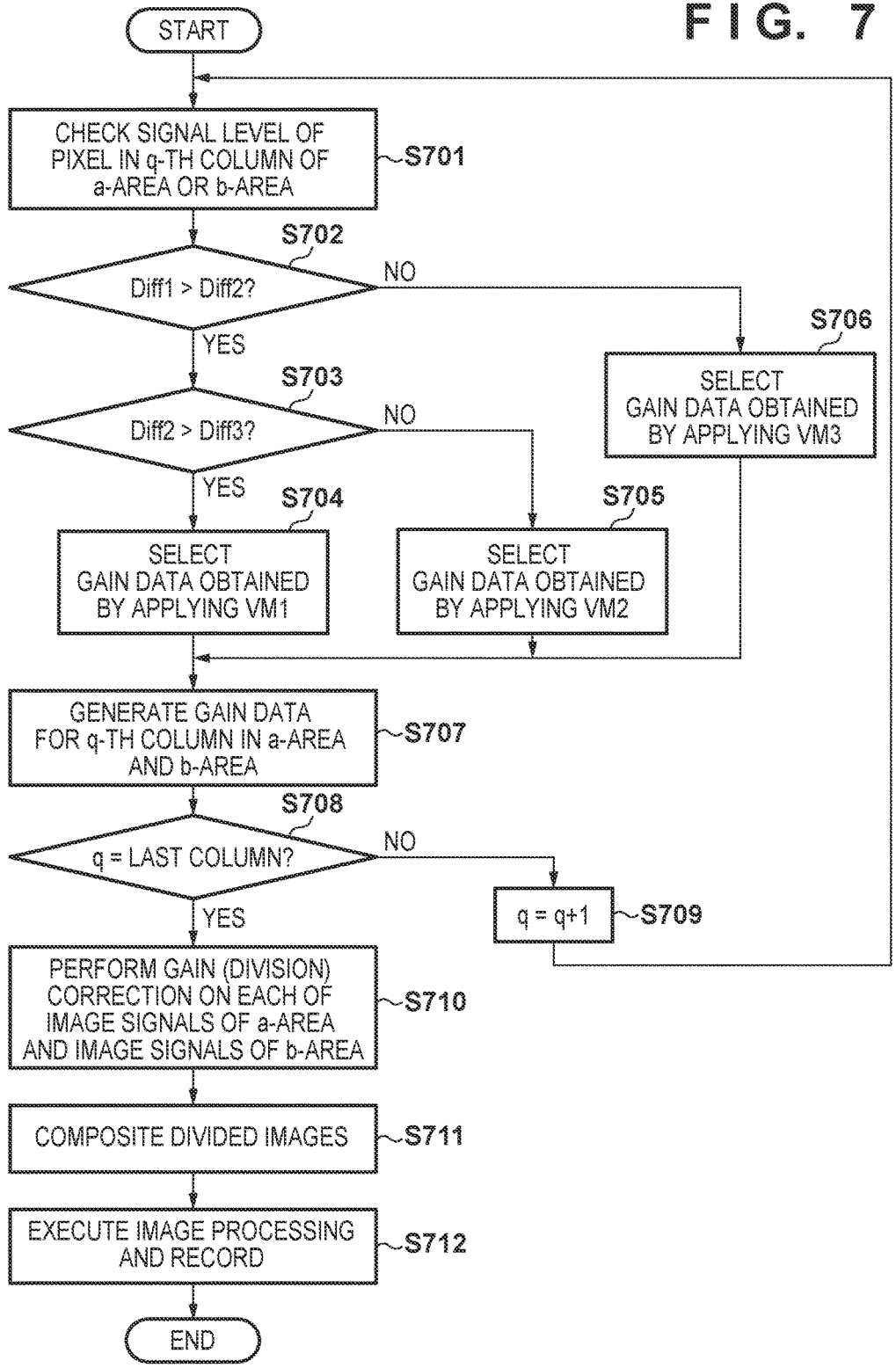
FIG. 7 is a flowchart of correction processing executed by an image capturing apparatus according to a second embodiment.

FIG. 7 is a flowchart showing an example of gain correction application processing according to the second embodiment. It is assumed that, before starting the processing shown in FIG. 7, gain data for each pixel column are obtained for each of the a-area and the b-area by applying the intermediate voltages VM1, VM2 and VM3 using the processes up to step S506 in FIG. 5 explained in the first embodiment.

First, in step S701, a signal level of a pixel in the $q^{th}$ column of the a-area or the b-area at the border of divided areas are checked from an image temporarily stored in the image memory 12. In step S702, an absolute value Diff1 of a difference between the signal level and a digital signal level SVM1 corresponding to the intermediate voltage VM1 and an absolute value Diff2 of a difference between the signal level and a digital signal level SVM2 corresponding to the intermediate voltage VM2 are compared. If the difference Diff1 is equal to or less than the difference Diff2 (No in step S702), then the process proceeds to step S706, and the gain obtained by applying the intermediate voltage VM1 is selected as a correction value for the $q^{th}$ column.

On the other hand, if the difference Diff2 is smaller than the difference Diff1 (Yes in step S702), then the process proceeds to step S703, where the difference Diff2 is compared with an absolute value Diff3 of a difference between the signal level and a digital signal level SVM3 corresponding to the intermediate voltage VM3. If the difference Diff2 is equal to or less than the difference Diff3 (No in step S703), the process proceeds to step S705, and a gain data obtained by applying the intermediate voltage VM2 is selected as the gain data for the $q^{th}$ column. If the difference Diff3 is smaller than the difference Diff2 (Yes in step S703), then the process proceeds to step S704, where the gain data obtained by applying the intermediate voltage VM3 is selected as the gain data for the $q^{th}$ column. In step S707, the gain data for the $q^{th}$ column corresponding to the signal levels of the $q^{th}$ column of the a-area and the b-area at the border of divided areas can be generated using gain data selected in one of steps S704 to S706.

Until the last column is processed, the process moves from step S708 to step S709 where q is incremented by 1, and steps S701 to S707 are performed with respective to the next column. When the last column is determined in step S708, the above-described processes are ended and the process advances to step S710, and gain (division) correction, composition of divided images, image processing and recording are performed similarly to the processes of step S507 to S509 in FIG. 5 described in the first embodiment.

According to the second embodiment as described above, a plurality of intermediate voltages VM are applied to the gates of the reset transistors RES of pixels at the border of divided areas, and gain data for each pixel column is obtained by applying the different intermediate voltages VM. Then, gain data generated by applying the intermediate voltage that is closest to a signal level of a pixel at the border of divided areas of a captured image can be used; accordingly, it is possible to perform high accuracy correction even if the vertical stripes due to gain has non-linear characteristics.

Third Embodiment

A third embodiment of the present invention will now be described. In the third embodiment, without being limited to one-dimensional gain data for respective pixel columns to be applied to pixels at the border of divided areas, a configuration for further obtaining necessary gains over a plurality of rows including a row adjoining to the pixels at the border of divided areas, and correcting image signals with the obtained gains will be explained.

A coefficient for converting signal charge to a voltage is determined in proportion to a reciprocal of a capacitance of a transfer node, and the capacitance includes a considerable amount of coupling capacitance generated by a vertical signal line. If an image sensor has a general configuration, the vertical signal lines do not terminate in an aperture area at least, and exist without a break over a range of distance that gives the coupling capacitance. By contrast, in a case where the vertical signal lines are divided, it is considered that, in the pixels near the border of divided areas, coupling capacitances generated by the vertical signal lines decrease drastically and coupling capacitances generated by the divided vertical signal lines on the other side through which signals from the pixels on this side are not read out are added. These complicated coupling capacitances become small as pixels are apart from the border of divided areas, and converge to gains originated only from column circuits and comparators. Accordingly, necessary gains are to be further obtained over a plurality of rows including a row adjacent to the pixels at the border of divided areas. Further, it is concerned that the parasitic capacitances may change with respect to temperature, and therefore, a correction method of obtaining gain data for each pixel column at the time of reading out captured image data as in the present invention is advantageous.

FIG. 8 is a flowchart showing a processing of correction data acquisition and gain (division) correction up to the $p^{th}$ row according to the third embodiment. Note that, in steps S501 to S506 in FIG. 8, the same processes as those of steps S501 to S506 in FIG. 5 of the first embodiment are performed. Accordingly, the same step numbers are given and explanation thereof is omitted.

After generating gain data for each pixel column using signals from the pixels at the border of divided areas, gain data is generated using signals from the pixels near the border of the divided areas in a similar manner, and in step S807, the maximum value of differences between gains in the $p^{th}$ row and gains in the $(p-1)^{th}$ row (a-area) or the $(p+1)^{th}$ row (b-area) falls within a predetermined range (here 1%). As for the pixels at the border of divided areas, differences are checked assuming that gains in the previous row are 1.0. If the maximum value of the differences does not fall within the predetermined tolerance, the process proceeds to step S808 where the number of row p is incremented or decremented by 1, and the correction value acquisition operation for generating gain data is performed for a row that is further apart from the pixels at the border of divided areas.

If the maximum value of the differences falls within the predetermined tolerance in step S807, it is assumed that the necessary gains are obtained, and correction processing is performed in step S809. In step S809, until the row to be processed is determined as the final row in step S810, the gain (division) correction is executed sequentially using gain data for the $p^{th}$ row as execution of the correction proceeds.

In steps S811 and S812, composition of the divided images, image processing and recording are performed by the similar processes as steps S508 and S509 in FIG. 5 of the first embodiment.

According to the third embodiment as described above, the gain data for the $p^{th}$ row is sequentially used in the correction processing, it is possible to perform suitable correction corresponding to complicated change in coupling capacitances generated by the divided vertical signal lines and added to transfer nodes.

For example, although each vertical signal line is divided into two wires in the up-down direction in the first to third embodiments described above, the present invention is also applicable to a case in which each vertical signal line is divided into three wires or more in the up-down direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-110225, filed on Jun. 1, 2016 which is hereby incorporated by reference herein in its entirety.

What is claimed is:

1. An image capturing apparatus comprising:
   a pixel area composed of a plurality of pixels arranged in a matrix;
   a plurality of output circuits that apply preset processing to signals which are read out in parallel from a plurality of divided areas obtained by dividing the pixel area in a column direction and output the processed signals sequentially on a row-by-row basis;
   a controller that performs control to execute first driving for reading out signals corresponding to a predetermined voltage to the output circuits from a predetermined row, and second driving for reading out image signals from the pixel area to the output circuits sequentially for each row; and
   a correction circuit that generates gain data for each column based on the predetermined voltage for correcting differences between the signals for correction of different columns output via the output circuits for each of the divided areas, and corrects the image signals of the divided areas output via the output circuits using the gain data generated for the corresponding divided areas,
   wherein the predetermined row is part of rows that includes a row at a border of the divided areas,
   wherein each of the plurality of pixels includes a photoelectric converter, a transfer node to which charge generated by the photoelectric converter is transferred, and a reset transistor connected between the transfer node and a power supply,
   wherein the pixel area includes a plurality of vertical signal lines each arranged for each column and divided at the border of the divided areas, and signals are read out from the plurality of divided areas to the output circuits in parallel via the divided vertical signal lines, and
   wherein the correction circuit generates the gain data by dividing the signal for correction of each divided area for each column by an average value of the signals for correction of one of the plurality of divided areas.

2. The image capturing apparatus according to claim 1, wherein
   in the first driving, the controller controls to read out the signals for correction corresponding to voltages of the transfer nodes to the output circuits in a state in which a predetermined third voltage is applied to gates of the reset transistors, the third voltage being between a first voltage that turns off the reset transistors and a second voltage that is greater than the first voltage.

3. The image capturing apparatus according to claim 2, wherein
   in the first driving, the controller further controls to read out signals for correction to the output circuits while applying a fourth voltage, that is different from the third voltage and is between the first voltage and the second voltage, to the gates of the reset transistors, and
   the correction circuit obtains a difference between the image signal obtained from the pixel area of a predetermined row and the signal for correction corresponding to the third voltage, and a difference between the image signal and the signal for correction corresponding to the fourth voltage respectively for each column, and selects the gain data generated from the signal for correction whose difference with the image data is smaller than the other difference.

4. The image capturing apparatus according to claim 1, wherein
   the controller controls to perform the first driving a plurality of times to read out the signals for correction, and
   the correction circuit excludes an outlier from a plurality of the signals for correction obtained by the plurality of first driving and takes an average of the remaining signals for correction for each column, and generates the gain data by dividing the average for each column of each area by an average of the signals for correction of any of the plurality of divided areas.

5. The image capturing apparatus according to claim 4, wherein
   after the controller controls to read out the signals for correction from a predetermined first row of the pixel area, the controller controls to read out the signals for correction from a second row that is away from the border of the divided areas,
   the correction circuit generates first gain data from the signal for correction of the first row and second gain data from the signal for correction of the second row, and
   in a case where a difference between an average of the first gain data and an average of the second gain data is greater than a predetermined value, the controller controls to read out the signals for correction of a third row that is next to the second row and is further away from the border of the divided areas.

6. The image capturing apparatus according to claim 1, wherein a memory used for storing the gain data for each of the plurality of divided areas.

7. The image capturing apparatus according to claim 1, further comprising a shield that shields the pixel area from light,
wherein the controller controls to execute the first driving while the shield is shielding the pixel area from light.

8. A control method for an image capturing apparatus that includes a pixel area and a plurality of output circuits, the pixel area being composed of a plurality of pixels arranged in a matrix, the output circuits applying preset processing to signals which are read out in parallel from a plurality of divided areas obtained by dividing the pixel area in a column direction and outputting the processed signals sequentially on a row-by-row basis, the control method comprising:
- reading out signals corresponding to a predetermined voltage to the output circuits from a predetermined row;
- generating gain data for each column based on the predetermined voltage for correcting differences between the signals for correction of different columns output via the output circuits for each of the divided areas;
- reading out image signals from the pixel area to the output circuits; and
- correcting the image signals of the divided areas output via the output circuits using the gain data generated for the corresponding divided areas,
wherein the predetermined row is part of rows that includes a row at a border of the divided areas, wherein each of the plurality of pixels includes a photoelectric converter, a transfer node to which charge generated by the photoelectric converter is transferred, and a reset transistor connected between the transfer node and a power supply,
wherein the pixel area includes a plurality of vertical signal lines each arranged for each column and divided at the border of the divided areas, and signals are read out from the plurality of divided areas to the output circuits in parallel via the divided vertical signal lines, and
wherein the correcting comprises generating the gain data by dividing the signal for correction of each divided area for each column by an average value of the signals for correction of one of the plurality of divided areas.

9. The control method according to claim 8, wherein
in reading out the signals for correction to the output circuits, the signals for correction corresponding to voltages of the transfer nodes are read out to the output circuits in a state in which a predetermined third voltage is applied to gates of the reset transistors, the third voltage being between a first voltage that turns off the reset transistors and a second voltage that is greater than the first voltage.

* * * * *